(12) United States Patent
Uskert

(10) Patent No.: US 9,151,166 B2
(45) Date of Patent: Oct. 6, 2015

(54) COMPOSITE GAS TURBINE ENGINE COMPONENT

(75) Inventor: Richard Christopher Uskert, Noblesville, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 869 days.

(21) Appl. No.: 12/795,391

(22) Filed: Jun. 7, 2010

(65) Prior Publication Data

US 2011/0299976 A1    Dec. 8, 2011

(51) Int. Cl.
    *F01D 5/14*      (2006.01)
    *F01D 5/28*      (2006.01)
    *F01D 5/22*      (2006.01)

(52) U.S. Cl.
CPC ............... *F01D 5/282* (2013.01); *F01D 5/147* (2013.01); *F01D 5/225* (2013.01); *F01D 5/284* (2013.01); *F05D 2300/6033* (2013.01); *Y02T 50/672* (2013.01); *Y10T 156/1026* (2015.01); *Y10T 156/1028* (2015.01)

(58) Field of Classification Search
CPC ......... F01D 11/08; F01D 11/12; F01D 11/00; F01D 11/02; F01D 5/22; F01D 5/225; F01D 5/20; F01D 5/282; F05D 2300/6033
USPC ......... 415/173.1, 173.5, 173.6; 416/195, 232; 29/889.23, 889.71; 264/257, 258
See application file for complete search history.

(56) References Cited

U.S. PATENT DOCUMENTS

| | | | | |
|---|---|---|---|---|
| 2,278,040 A | * | 3/1942 | Allen .......................... | 416/191 |
| 3,632,460 A | * | 1/1972 | Palfreyman et al. .......... | 156/175 |
| 4,098,559 A | * | 7/1978 | Price ............................ | 416/230 |
| 4,256,790 A | * | 3/1981 | Lackman et al. ............... | 428/73 |
| 4,966,802 A | * | 10/1990 | Hertzberg ..................... | 428/119 |
| 5,154,581 A | * | 10/1992 | Borufka et al. ............... | 416/190 |
| 6,280,550 B1 | * | 8/2001 | Steibel et al. ................. | 156/182 |
| 6,616,410 B2 | | 9/2003 | Grylls et al. | |
| 6,939,104 B2 | | 9/2005 | Chantal et al. | |
| 6,962,484 B2 | | 11/2005 | Brandl et al. | |
| 7,001,152 B2 | | 2/2006 | Paquet et al. | |

(Continued)

FOREIGN PATENT DOCUMENTS

| | | |
|---|---|---|
| DE | 31 10 096 | 9/1982 |
| EP | 1 927 732 | 6/2008 |

(Continued)

OTHER PUBLICATIONS

Translation of JP 2003-148105.*

(Continued)

*Primary Examiner* — Igor Kershteyn
*Assistant Examiner* — Woody A Lee, Jr.
(74) *Attorney, Agent, or Firm* — Krieg DeVault LLP

(57) ABSTRACT

A gas turbine engine component is disclosed having a composite construction. In one embodiment the gas turbine engine component is a blade that includes a shroud. A fiber ply of the composite construction extends from an airfoil part of the blade to the shroud. The shroud can include multiple plies that can be stitched together. In one form a sealing knife is formed and coupled to the shroud. The sealing knife can be coupled to the shroud by stitching. Filler material can be used in the composite construction of the gas turbine engine component.

17 Claims, 3 Drawing Sheets

(56) References Cited

U.S. PATENT DOCUMENTS

| | | | |
|---|---|---|---|
| 7,066,717 | B2 | 6/2006 | Morrison et al. |
| 7,153,464 | B2 * | 12/2006 | Millard et al. ............... 264/317 |
| 7,393,182 | B2 | 7/2008 | Matheny |
| 7,579,094 | B2 * | 8/2009 | Subramanian et al. ....... 428/698 |
| 7,600,979 | B2 * | 10/2009 | Steibel et al. ................ 416/230 |
| 8,052,826 | B2 * | 11/2011 | Burpo et al. .................. 156/257 |
| 8,297,934 | B2 | 10/2012 | Lutz |
| 2002/0064456 | A1 | 5/2002 | Marlin et al. |
| 2005/0097741 | A1 | 5/2005 | Haehnle et al. |
| 2009/0060747 | A1 | 3/2009 | Strock et al. |
| 2009/0202355 | A1 * | 8/2009 | Dierksmeier et al. ........ 416/226 |
| 2012/0301314 | A1 * | 11/2012 | Alvanos et al. ............... 416/230 |
| 2012/0301317 | A1 * | 11/2012 | Alvanos et al. ........... 416/241 B |
| 2013/0011271 | A1 * | 1/2013 | Shi et al. ...................... 416/230 |

FOREIGN PATENT DOCUMENTS

| | | | |
|---|---|---|---|
| JP | 2003 148105 | | 5/2003 |
| JP | 2003148105 A | * | 5/2003 |
| WO | WO 91/15357 | | 10/1991 |
| WO | WO 2005/082605 | | 9/2005 |
| WO | WO 2008/000014 | | 1/2008 |
| WO | WO 2010/097277 | | 9/2010 |

OTHER PUBLICATIONS

Extended European Search Report, EP 11 250 581.1, Rolls-Royce North American Technologies Inc., Apr. 11, 2013.
English version of abstract of JP 2003 148105.
English language machine translation of description and claims of WO 2010/097277.

* cited by examiner

COMPOSITE GAS TURBINE ENGINE COMPONENT

TECHNICAL FIELD

The present invention generally relates to gas turbine engine components, and more particularly, but not exclusively, to gas turbine engine turbomachinery components.

BACKGROUND

Building gas turbine engine components having a composite construction remains an area of interest. Some existing systems have various shortcomings relative to certain applications. Accordingly, there remains a need for further contributions in this area of technology.

SUMMARY

One embodiment of the present invention is a unique gas turbine engine component having a composite construction. Other embodiments include apparatuses, systems, devices, hardware, methods, and combinations for forming composite gas turbine engine blades. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
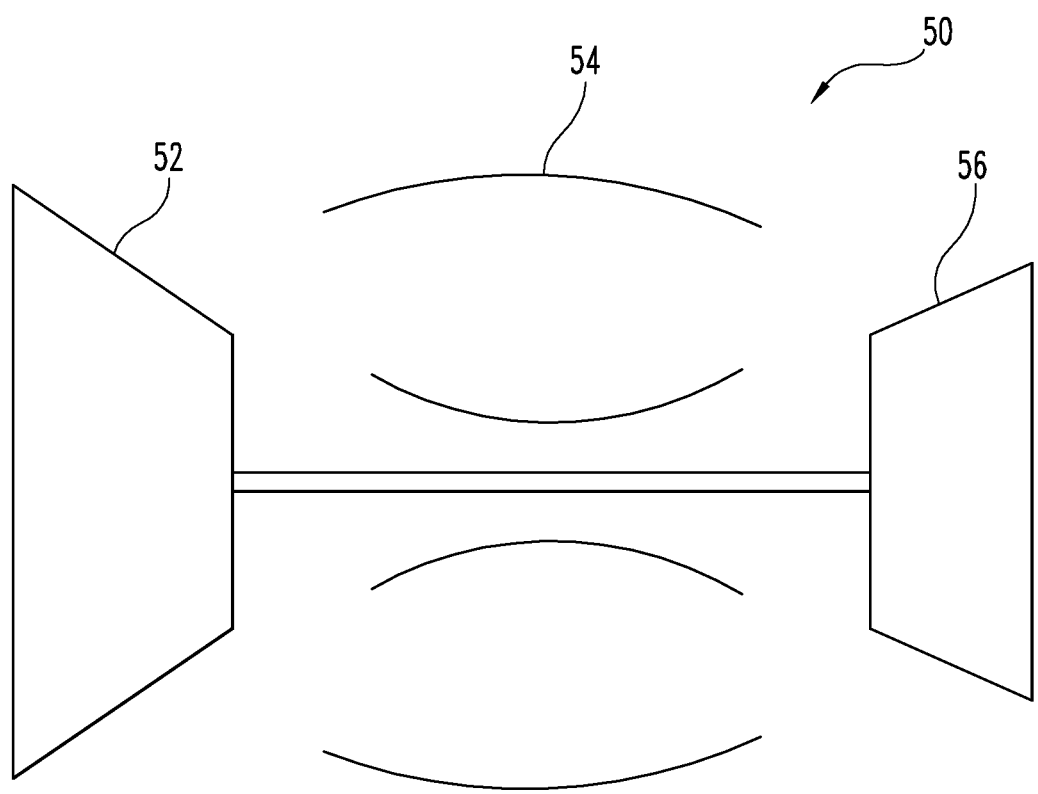
FIG. 1 depicts one embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 is illustrated having a compressor 52, combustor 54, and turbine 56. Air is provided to the compressor 52 whereupon it is compressed and provided to the combustor 54. Fuel is mixed with the compressed air and burned and then provided to the turbine 56. Though the gas turbine engine 50 is depicted as a single spool engine, in other embodiments the gas turbine engine 50 can have multiple spools. The gas turbine engine 50 can be used in various applications and can take a variety of forms. To set forth just a few non-limiting examples, the gas turbine engine can take the form of a turbofan, turbojet, turboprop, or turboshaft engine. In one application the gas turbine engine can be used as an aircraft powerplant.

As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2:
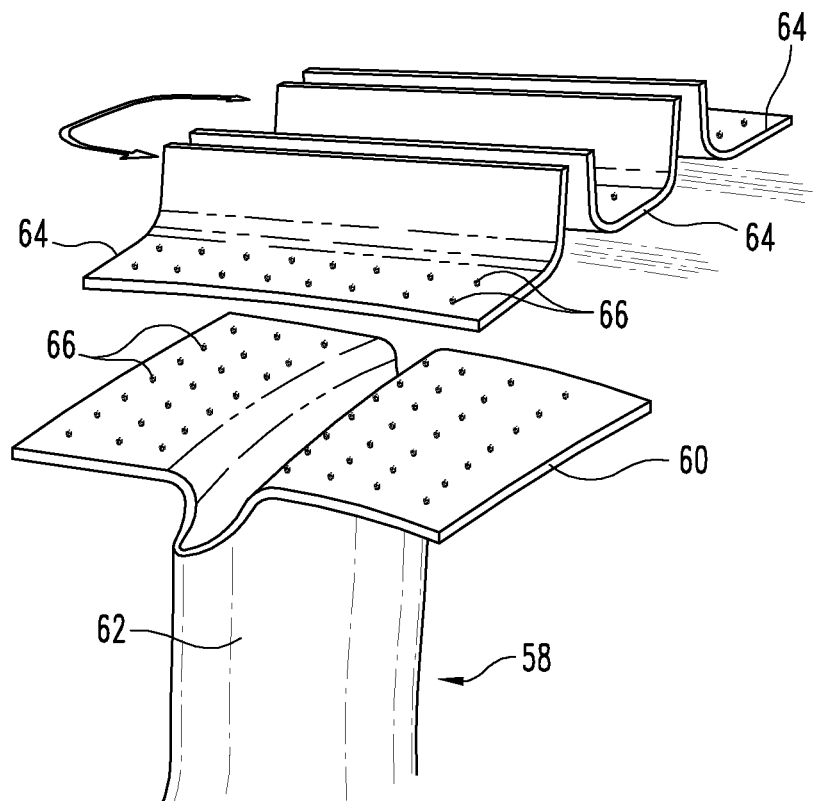
FIG. 2 depicts one embodiment of a gas turbine engine component.

With reference to FIG. 2, a portion of a gas turbine engine component 58 is shown having the shape of a blade useful within a turbomachinery component of the gas turbine engine 50. In one form the gas turbine engine component 58 is used within the turbine 56 (shown in FIG. 1) of the gas turbine engine 50. In other embodiments the gas turbine engine component 58 can take other forms for use in various portions of the gas turbine engine 50. The gas turbine engine component 58 is made from a composite construction that includes a matrix and one or more plies that include a plurality of fibers. In one form the gas turbine engine component 58 is made from a ceramic matrix composite (CMC), but other types of composites are also contemplated herein. The matrix that composes the CMC composite can be applied in a variety of ways, including single step, two step, or multiple steps. In addition, the matrix can be deposited via chemical vapor deposition among other possible techniques. The fibers that make up the plies of the composite construction can be various denier and the plies can have various thread count. In addition, the fibers can be unidirectional or cross plied, as well as any other orientation. In general the plies can be any architecture, including 2D or 3D, tape, woven, etc. In some forms, such as some 2D architectures, adjacent plies can be stitched together to maintain a shape during processing.

Figure 4:
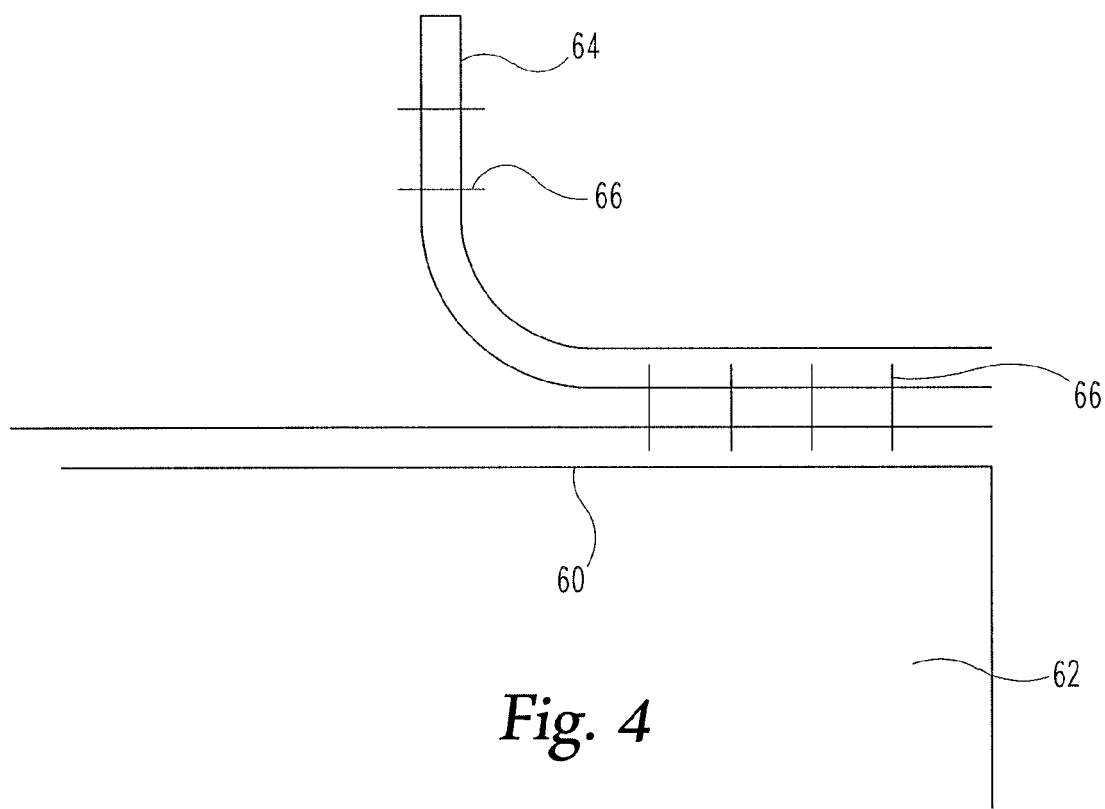
FIG. 4 depicts one embodiment of a gas turbine engine component.

The gas turbine engine component 58 includes an extension 60 oriented transverse to an elongate portion of the gas turbine engine component 58, which in the illustrative embodiment the elongate portion is an airfoil member portion 62 forming part of the blade. In the depiction in FIG. 2 the extension 60 takes the form of a blade shroud. The extension 60 is formed when one or more plies used in the airfoil member portion 62 are turned to create the extension 60. In this way a plurality of fibers that form part of the airfoil member portion 62 also create the extension 60. The plies that form the extension 60, however, need not extend from the root of the gas turbine engine component 58 to its tip. The extensions 60 can have multiple sections of plies oriented in the same or even different directions. In some embodiments the extension 60 can additionally include one or more fiber plies that do not otherwise extend into the airfoil member portion 62 such that the additional plies reside primarily in the extension 60. In some embodiments the extension 60 can include multiple plies that are stitched together. The gas turbine engine component 58 can be a continuous wrap ply or can be created by individual plies. In some applications, one or more plies can be darted as shown at reference numeral 63 of FIG. 4 to create the extension 60. Depending on the application, other techniques such as, but not limited to, pleats and gussets can be used with respect to the extension 60 and/or any other portion of the gas turbine engine component 58.

The gas turbine engine component 58 can also include extension members 64 having a portion generally oriented along the elongate portion of the gas turbine engine component 58. In some embodiments of the gas turbine engine component 58, however, the extension members 64 may not be present. In the illustrative form the extension members 64 take the form of sealing knives that can be used with a device or structure formed in or coupled to a casing of the gas turbine engine 50. Though there are three extension members 64 depicted in FIG. 1, fewer or more can be present in other embodiments. The extension members 64 have a variety of non-limiting forms in the illustrative embodiment. Two L-shaped extension members 64 sit on opposite sides of a U-shaped extension member 64. Each of the extension members 64 depicted in FIG. 2 can have identical numbers and orientations of plies, as well as matrix material, but in other embodiments each can be tailored independent of the other. The extension members 64 can be either in direct contact with the end portion of the gas turbine engine component 58, or an intermediate structure or material can be disposed between the two.

The individual plies of either or both the extension 60 and the extension members 64 can be coupled together, such as through stitching 66. In some forms the extension 60 can be stitched to one or more of the extension members 64. In some embodiments it may be possible to stitch a subset of all plies within either or both of the extension 60 and extension members 64. Though not depicted in the illustrative embodiment, the extension members 64 can be stitched together in their upturned portions.

Filler can be used in select areas of the gas turbine engine component 58, and in some cases can be used between fiber plies when the orientation of the plies creates voids. To provide just two non-limiting examples, a fiber "noodle" or collection of tow, or both, can be used. Such fillers can be placed, for example, between the upturned legs of the plies of the extension members 64, between the plies of the extension member 64 and the plies of the airfoil member portion 62, and additionally and/or alternatively near the tip of the gas turbine engine component 58 between the extensions 60 that define the shape of the airfoil member portion 62. Other locations are also contemplated herein. In some embodiments the tow can be crimped or it can be uncrimped, and it can have various lengths and a variety of denier.

In one form of manufacture multiple plies of the composite construction are collated together to a certain thickness and can be formed to a desired shape. The plies can be collated on tooling, such as a mold or a mandrel, among others, to define the shape, or near shape, of the desired component. During fabrication the composite construction can be rigidized while coupled with the tooling and prior to the introduction of the matrix. Rigidization can occur when fibers are bonded with a bonding material at points of contact. In some forms the bonding material can thoroughly coat the fibers. After rigidization the intermediate form can be further processed by removing the mandrel, mold or other tooling. In one non-limiting example the mandrel can be removed by physical, chemical, or thermal processes, among others. In any event, a matrix is provided to infiltrate between the plies and fibers to form the composite construction.

Figure 3:
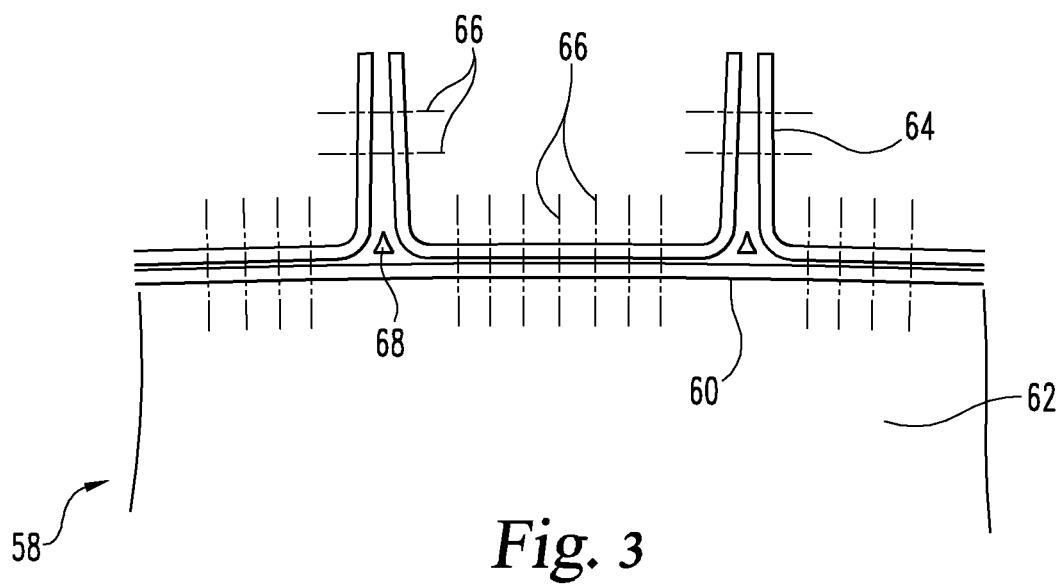
FIG. 3 depicts one embodiment of a gas turbine engine component.

Turning now to FIG. 3, one embodiment of the gas turbine engine component 58 is shown having the extension 60 and extension members 64. The plies are depicted as solid lines where each of the extension members 64 includes two plies and the extension includes two plies. Stiches 66 are shown coupling the upturned portions of the extension members 64 and extension 60. Also shown in FIG. 3 is a filler 68 disposed in an area between the extension 60 and the extension members 64.

One aspect of the present application provides an apparatus comprising a gas turbine engine airflow member having an airfoil portion and a shroud portion and constructed from a composite material construction including a matrix and a plurality of fiber plies, at least one of the fiber plies extending from the airfoil portion to the shroud portion.

Another aspect of the present application provides an apparatus comprising a gas turbine engine turbomachinery component having a plurality of airfoil members capable of directing a flow stream through the component, each of the plurality of airfoil members made from a composite material and having a tip shroud integral with a portion of the airfoil member extending from a hub of the gas turbine engine turbomachinery component.

Still another aspect of the present application provides an apparatus comprising a gas turbine engine rotatable blade having an airfoil part and a shroud disposed at an end of the blade, the blade made of a composite construction having a ply and a matrix, and means for forming the shroud from a ply of the airfoil part.

Yet still another aspect of the present application provides a method comprising engaging a ply of a composite construction with a device that forms a blade shape of a gas turbine engine component, laying up the ply such that the ply extends from an airfoil part of the blade shape and continues to a shroud part of the blade shape, and coupling a plurality of plies of the blade shape with a matrix material to form the composite construction.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a gas turbine engine airflow member having an airfoil portion and a shroud portion and constructed from a composite material construction including a matrix and a plurality of fiber plies, at least one of the fiber plies extending from the airfoil portion to the shroud portion;
wherein the gas turbine engine airflow member includes a sealing knife coupled to the end of the gas turbine engine airflow member,
wherein the sealing knife includes a plurality of extension members oriented along and extending transverse to an elongate portion of the airfoil portion,
wherein the extension members include adjacent upright members that are stitched together;
wherein the transverse extension members include a plurality of fiber plies and the shroud portion includes a plurality of fiber plies, and
a plurality of stitches affixing either a subset of all of the individual plies that form the transverse extension members of the sealing knife to said at least one of the individual fiber plies extending to the shroud portion wherein a second subset of all the individual plies that form the transverse extension members is not affixed to the shroud portion, or a subset of all of the individual plies that form the shroud portion to at least one of the individual fiber plies forming the transverse extension members wherein a second subset of all the individual plies that form the shroud portion is not affixed to the transverse extension members.

2. The apparatus of claim 1, wherein the composite material construction is a ceramic matrix composite.

3. A gas turbine engine comprising:
a component, and
an apparatus according to claim 1, wherein the gas turbine engine airflow member of the apparatus is integrated within the component of the gas turbine engine.

4. The gas turbine engine of claim 3, wherein the component is a hot section component.

5. The apparatus of claim 1, wherein the plurality of fiber plies include two dimensional orientation.

6. The apparatus of claim 1, wherein the plurality of fiber plies include three dimensional orientation.

7. The apparatus of claim 1, wherein the plurality of fiber plies include at least one fiber ply that has been darted.

8. An apparatus comprising:
a gas turbine engine turbomachinery component having a plurality of airfoil members capable of directing a flow stream through the component, each of the plurality of airfoil members made from a composite material and having a tip shroud integral with a portion of the airfoil member extending from a hub of the gas turbine engine turbomachinery component,
wherein the plurality of airfoil members includes sealing knives,
wherein the sealing knife includes a plurality of extension members oriented along and extending transverse to an elongate portion of the hub extending portion of the airfoil members,
wherein the extension members include adjacent upright members that are stitched together;
wherein the transverse extension members include a plurality of fiber plies and the tip shroud includes a plurality of fiber plies
wherein a plurality of stitches affixes either a subset of all of the individual plies that form the transverse extension members of the sealing knives to at least one individual fiber ply extending to the tip shrouds wherein a second subset of all the individual plies that form the transverse extension members is not affixed to the shrouds,
or a subset of all of the individual plies that form the tip shroud to at least one of the individual plies that form the transverse extension members wherein a second subset of all the individual plies that form the tip shrouds is not affixed to the transverse extension members; and
wherein a filler is disposed in an area between the tip shrouds and the sealing knives.

9. The apparatus of claim 8, wherein the plurality of airfoil members includes integral sealing knives.

10. The apparatus of claim 9, wherein the integral sealing knifes each include a plurality of sealing knives.

11. The apparatus of claim 10, wherein the plurality of sealing knives includes opposing L shapes and an intermediate U shape.

12. The apparatus of claim 9, wherein the integral sealing knives each include a composite ply separate from a composite ply of the plurality of airfoil members.

13. The apparatus of claim 8, wherein the composite material is a ceramic matrix composite material.

14. An apparatus comprising:
a gas turbine engine rotatable blade having an airfoil part and a shroud disposed at an end of the blade, and a sealing knife coupled to the shroud, the blade made of a composite construction having a ply and a matrix;
means for forming the shroud from a ply extending from the airfoil part; and
means for stitching the sealing knife to the shroud,
wherein the sealing knife includes a plurality of extension members oriented along and extending transverse to an elongate portion of the airfoil part,
wherein the extension members include adjacent upright members that are stitched together; and
wherein the transverse extension members include a plurality of fiber plies and the shroud includes a plurality of fiber plies, and
wherein the means for stitching includes a plurality of stitches affixing either a subset of all of the individual plies that form the transverse extension members of the sealing knife to at least one of the ply extending from the airfoil part to the shroud wherein a second subset of all the individual plies that form the transverse extension members is not affixed to the shroud,
or a subset of all of the individual plies that form the shroud to at least one of the individual fiber plies forming the transverse extension members wherein a second subset of all the individual plies that form the shroud is not affixed to the transverse extension members.

15. A method comprising:
engaging a ply of a composite construction with a device that forms a blade shape of a gas turbine engine component;
laying up the ply such that the ply extends from an airfoil part of the blade shape and continues to a shroud part of the blade shape; and
coupling a plurality of plies of the blade shape with a matrix material to form the composite construction;
which further includes forming a sealing knife portion with a separate ply and stitching the separate ply to the shroud part,
wherein the sealing knife includes a plurality of extension members oriented along and extending transverse to an elongate portion of the airfoil part,
wherein the extension members include adjacent upright members that are stitched together; and
wherein the transverse extension members include a plurality of fiber plies and the shroud includes a plurality of fiber plies, and
wherein the means for stitching includes a plurality of stitches affixing either a subset of all of the individual plies that form the transverse extension members of the sealing knife to at least one of the ply extending from the airfoil part to the shroud
wherein a second subset of all the individual plies that form the transverse extension members is not affixed to the shroud,
or a subset of all of the individual plies that form the shroud to at least one of the individual fiber plies forming the transverse extension members wherein a second subset of all the individual plies that form the shroud is not affixed to the transverse extension members.

16. The method of claim 15, wherein the laying up includes darting the ply.

17. The method of claim 16, which further includes laying up a plurality of plies to create the shroud part.

* * * * *